(12) United States Patent
Yang

(10) Patent No.: US 6,699,610 B2
(45) Date of Patent: Mar. 2, 2004

(54) ANODE STREAM RECIRCULATION SYSTEM FOR A FUEL CELL

(75) Inventor: Jefferson YS Yang, Orange, CA (US)

(73) Assignee: Asia Pacific Fuel Cell Technologies, Ltd., Taipei (TW)

( * ) Notice: Subject to any disclaimer, the term of this patent is extended or adjusted under 35 U.S.C. 154(b) by 417 days.

(21) Appl. No.: 09/938,959

(22) Filed: Aug. 24, 2001

(65) Prior Publication Data

US 2002/0150801 A1 Oct. 17, 2002

(30) Foreign Application Priority Data

Apr. 16, 2001 (TW) .................................... 90109035 A

(51) Int. Cl.$^7$ ............................................... H01M 8/04
(52) U.S. Cl. ............................ 429/22; 429/19; 429/25
(58) Field of Search ............................ 429/22, 17, 19, 429/25

(56) References Cited

U.S. PATENT DOCUMENTS

| | | | |
|---|---|---|---|
| 4,098,959 A | * 7/1978 | Fanciullo ..................... 429/25 |
| 4,619,589 A | 10/1986 | Muller et al. |
| 4,824,340 A | 4/1989 | Bruggeman et al. |
| 4,966,528 A | 10/1990 | Henkel et al. |
| 5,246,351 A | 9/1993 | Horn et al. |
| 5,252,410 A | 10/1993 | Wilkinson et al. |
| 5,484,666 A | 1/1996 | Gibb et al. |
| 5,547,777 A | 8/1996 | Richards |
| 5,635,039 A | 6/1997 | Cisar et al. |
| 5,773,160 A | 6/1998 | Wilkinson et al. |
| 5,798,186 A | 8/1998 | Fletcher et al. |
| 5,840,438 A | 11/1998 | Johnson et al. |
| 5,952,119 A | * 9/1999 | Wilson ......................... 429/34 |
| 5,976,725 A | * 11/1999 | Gamo et al. ................. 429/25 |
| 6,132,449 A | 10/2000 | Lum et al. |
| 6,149,810 A | 11/2000 | Gonzalez-Martin et al. |
| 6,200,698 B1 | 3/2001 | Carlstrom, Jr. |
| 6,265,093 B1 | 7/2001 | Surampudi et al. |
| 6,280,865 B1 | * 8/2001 | Eisman et al. ................. 429/17 |
| 6,360,835 B1 | 3/2002 | Skala |
| 6,436,562 B1 | 8/2002 | DuBose |
| 6,447,945 B1 | 9/2002 | Streckert et al. |
| 6,464,846 B1 | 10/2002 | Titterington |
| 6,562,502 B2 | * 5/2003 | Haltiner, Jr. ................. 429/25 |
| 6,569,298 B2 | 5/2003 | Merida-Donis |
| RE38,156 E | * 6/2003 | Strasser ....................... 429/13 |
| 6,646,413 B2 | * 11/2003 | Autenrieth et al. ......... 320/101 |

FOREIGN PATENT DOCUMENTS

| | | |
|---|---|---|
| EP | 0 741 428 A1 | 4/1995 |
| JP | 03-113188 A | 5/1991 |
| JP | 08-045517 | 2/1996 |
| JP | 10-055813 | 2/1998 |
| JP | 11-154522 | 6/1999 |
| JP | 2000-133290 | 5/2000 |

OTHER PUBLICATIONS

Japanese Office Action for Patent Application No. 2002–38677, 3 pages, Sep. 17, 2002.
European Search Report for EP 02 01 4823 dated Feb. 13, 2003, 3 pages, European Patent Office.

* cited by examiner

Primary Examiner—Bruce F. Bell

(57) ABSTRACT

This invention is related to an anode stream recirculation system for a fuel cell comprising an anode gas supply, a switch and a regulating device to properly control the amount of anode gas supply; a sensor connected with the switch to detect the pressure of the anode gas discharged from the fuel cell and to control the open/close of the switch; and a humidifier to adjust the humidity of the anode gas discharged from the fuel cell. The discharged anode gas after the adjustment of the humidity thereof is redirected to anode gas input of the fuel cell to form an anode gas recirculation.

10 Claims, 3 Drawing Sheets

US 6,699,610 B2

ANODE STREAM RECIRCULATION SYSTEM FOR A FUEL CELL

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention is related to an anode stream recirculation system for a fuel cell, in particular, an anode stream recirculation system used in a proton exchange membrane fuel cell, and most particularly, a hydrogen recirculation system utilized in a proton exchange membrane fuel cell. The present invention eliminates certain elements required in the conventional anode stream recirculation system for a fuel cell and, thus reduces the cost for manufacture of the components of the fuel cell. Furthermore, this invention lowers the electrical energy required for running the anode stream recirculation system so that the overall efficiency of electrical power generation for the fuel cell system can be promoted.

2. Description of the Related Art

With the rapid growth of civilization the consumption of traditional energy resources, such as coal, oil and natural gas, increases rapidly. This results in serious environmental pollution and causes a series of environmental problems such as global warming and acid rain. It has now been recognized that the natural energy resources are limited. Therefore, if the present rate of energy consumption continues, all existing natural energy resources will be exhausted in the near future. Accordingly, many developed countries are conducting research and development of new and alternative energy resources. The fuel cell is one of the most important and reasonably priced energy resources. Compared with traditional internal combustion engines, the fuel cell has many advantages such as high energy conversion efficiency, clean exhaust, low noise, and no consumption of traditional gasoline.

In brief, a fuel cell is an electrical power generation device powered by the electrochemical reaction of hydrogen and oxygen. Basically, the reaction is a reverse reaction of the electrolysis of water, to convert the chemical energy into electrical energy. The basic structure of a fuel cell, for example, a proton exchange membrane fuel cell, comprises a plurality of cell units. The structure of the cell unit generally illustrated in FIG. 1 comprises a proton exchange membrane (PEM) 10 at the middle, with the two sides thereof provided with a layer of catalyst 12, each of the two outsides of the catalyst 12 is further provided with a gas diffusion layer (GDL) 14. An anode plate 16 and a cathode plate 18 are further provided at the outermost sides adjacent to the GDL 14. After tightly combining all the above elements together, a cell unit is formed. For practical application of the fuel cell, a plurality of the above cell units are stacked and serially connected to provide sufficient power, as illustrated in FIG. 2. Therefore, two adjacent cell units can share a common polar plate 20, as illustrated in FIG. 3, which serves as the anode and the cathode for the two adjacent cell units, respectively. Accordingly, such a polar plate 20 is usually referred as a bipolar plate. Generally, as illustrated in FIG. 3, the two sides of the bipolar plate 20 are provided with many groove type gas channels 22 for transporting the gases for reaction, such as hydrogen and air (to provide oxygen), as well as transporting the reactants, such as water droplets or vapor, out of the bipolar plate 20.

One conventional gas supply system for use in a fuel cell comprises: a cathode gas supply system (such as an oxygen supply), and an anode circulation system (such as a hydrogen circulation system), as illustrated in FIG. 4. Atmospheric air may serve as a supply of the oxygen supply system 30, where air is filtered by a filter 32 and than pumped into the fuel cell 50 through a blower 34. Excessive air, upon reaction within the fuel cell 50, is discharged through a water recuperator 36. The water recuperator 36 may recuperate the minute amount of water contained within the discharged air, where the water is then directed to a cooling system 38. The useless heat generated by the fuel cell 50 is also transmitted to the cooling system 38. The coolant used in the cooling system 38 then re-enters the fuel cell 50 to provide sufficient cooling thereto.

The conventional anode circulation system includes: a hydrogen source 40 which regulates hydrogen input through a regulation valve 42; a hydrogen pump 44 being provided at the other end of the fuel cell 50 for discharging excessive hydrogen, upon reaction within the fuel cell, and for pumping the hydrogen source 40 into the fuel cell 50. The excessive hydrogen is discharged through a humidifier 46, such as a bubbler, for increasing the humidity of the excessive hydrogen, then flows back into the piping of the hydrogen supply to be mixed with fresh hydrogen, and then repeats the same circulation. The water within the humidifier 46 can be communicated with the water within the cooling system 38.

The hydrogen within the bipolar plate of the fuel cell must have adequate humidity such that the hydrogen ions ($H^+$) after reaction can be carried through the PEM by the water vapor. The hydrogen ions then react with the oxygen at the other side of the PEM and the electrons provided from the outer circuit, to establish proton conduction. Generally, if the humidity of the hydrogen is too low, the PEM will be dehydrated, thus, the electrical resistance of the fuel cell will increase and the voltage of the fuel cell will decrease, which will result in the working life of the fuel cell being significantly shortened. If, on the other hand, the humidity of the hydrogen is too high, the channels for transporting the gases within the bipolar plate may be clogged by water droplets, which will stop the reaction of gases within the fuel cell and the performance of the fuel cell will be seriously impaired. Accordingly, in the anode stream recirculation system, a humidifier to adjust the humidity of the hydrogen is generally required.

BRIEF SUMMARY OF THE INVENTION

A primary objective of this invention is to improve the conventional anode stream recirculation system by detecting the pressure of the excessive hydrogen discharged from the fuel cell to determine the open/close of the hydrogen source. Therefore, the conventional hydrogen pump may be eliminated and the parasitic loss of electrical energy of the fuel cell itself can be reduced and the overall efficiency of electrical power generation by the fuel cell system can be promoted.

A further objective of this invention is to automatically clear out the gas channels of the bipolar plates within the fuel cell by the pressure pulses introduced from intermittently open/close of the hydrogen source so that no water droplet will stay within the gas channels to impair the power generation efficiency of the fuel cell. A further objective of this invention is to simplify the manufacturing process and to lower the production cost of the fuel cell by improving the design of the humidifier used in the anode stream recirculation system.

The primary technical contents of this invention are related to an anode stream recirculation system for a fuel cell. The fuel cell includes an anode gas input and an anode gas output. The anode stream recirculation system comprises: an anode gas supply providing the anode gas required for reaction of the fuel cell; a switch connected with the anode gas supply to control the open/close of the anode gas supply; a regulating device with one end thereof being connected with the switch and the other end thereof being connected with the anode gas input of the fuel cell, to control the amount of supplied anode gas; a sensor connected with both the anode gas output of the fuel cell so as to detect the amount of the anode gas discharged from the fuel cell after reaction, the sensor also connected with the switch so as to control the open/close of the switch; and a humidifier connected between the anode gas output and anode gas input of the fuel cell, to adjust the humidity of the discharged anode gas; the discharged anode gas after the adjustment of the humidity thereof is redirected to anode gas input of the fuel cell thereby forming an anode gas recirculation.

The structures and characteristics of this invention can be realized by referring to the appended drawings and explanations of the preferred embodiments.

DETAILED DESCRIPTION OF THE INVENTION

Figure 1:
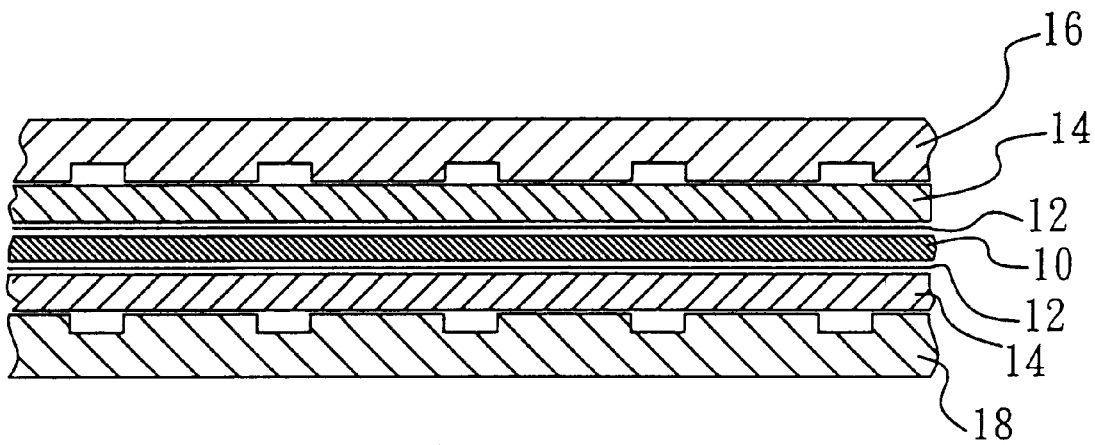
FIG. 1 is a schematic cross sectional view showing the structure of a cell unit of a conventional fuel cell.
Figure 2:
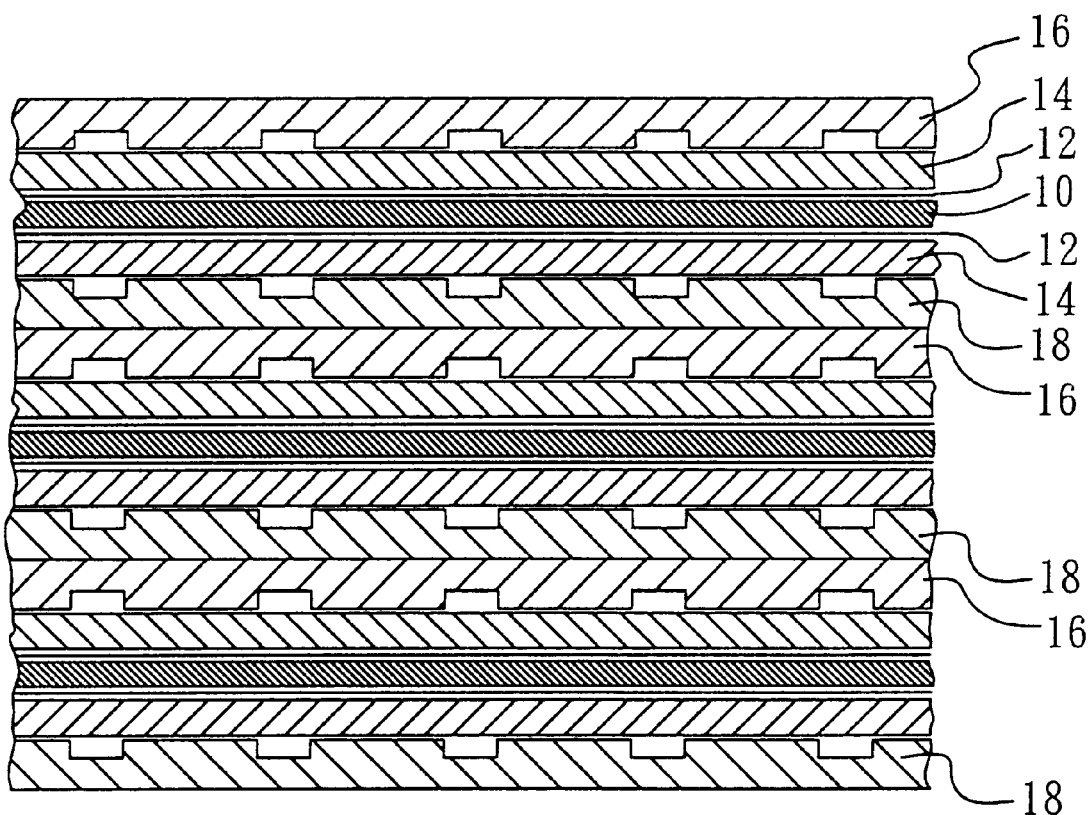
FIG. 2 is a schematic cross sectional view showing the structure of combining a plurality of the conventional cell units.
Figure 3:
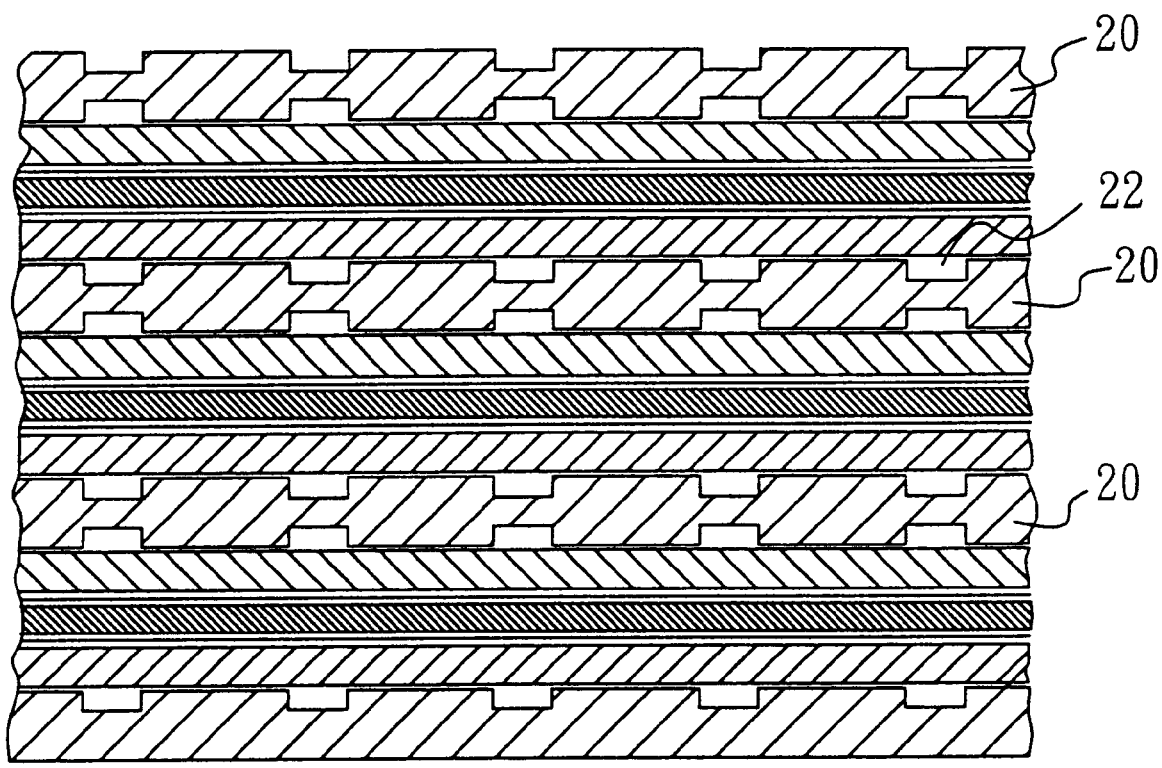
FIG. 3 is a schematic cross sectional view showing a portion of the conventional fuel cell.
Figure 4:
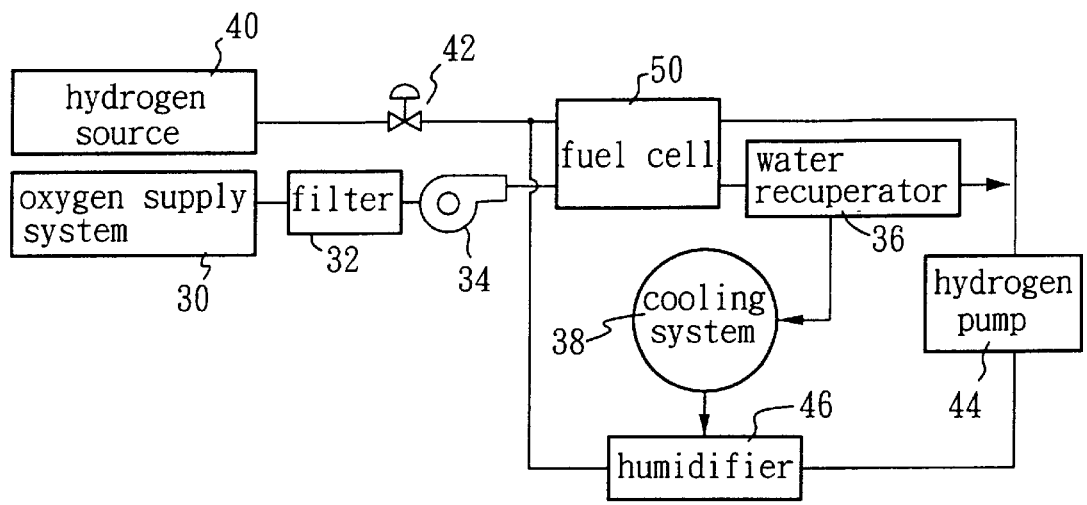
FIG. 4 is a schematic view showing a gas supply of a conventional fuel cell.
Figure 5:
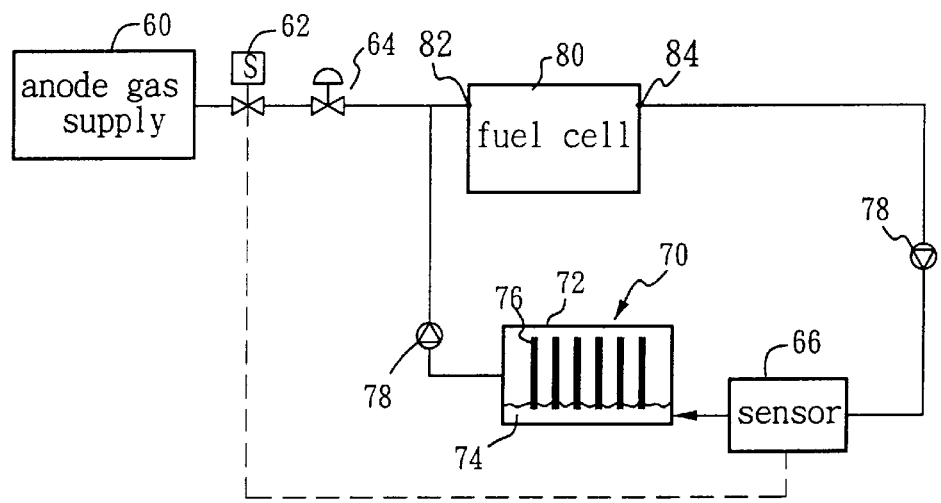
FIG. 5 is a schematic view showing a preferred embodiment of an anode gas recirculation system of this invention.

This invention is related to an anode stream recirculation system for a fuel cell, in particular, a hydrogen recirculation system utilized in a proton exchange membrane (PEM) fuel cell. One preferred embodiment of this invention is substantially shown in FIG. 5, which includes an anode gas supply 60 to provide the anode gas required for the reaction proceeded in the fuel cell 80. For the present embodiment of the proton exchange membrane fuel cell, the anode gas is hydrogen. The anode gas flows through a switch 62 and a regulating device 64 before entering fuel cell 80 through an anode gas input 82. The switch 62 can be a solenoid valve which is used to control the open/close of the gas flow in the piping and to determine whether fresh anode gas should be released from the anode gas supply 60. The regulating device 64 may be a regulation valve, for example, to adjust the amount of the anode gas flowing therethrough. Generally, the regulating device is set to provide the flowing amount of the anode gas higher than the required Stoichiometric amount for a specific electrical power generation of the fuel cell so as to ensure that the electrochemical reaction takes place entirely within the fuel cell 80. The fuel cell 80 also has an anode gas output 84. The anode stream recirculation system further comprises a sensor 66, such as a pressure switch in this preferred embodiment, somewhere after the anode gas output 84 along the anode gas output piping. The sensor 66 is used to detect the pressure or the amount of the anode gas discharged from the fuel cell 80. In addition, the sensor 66 is electrically connected with the switch 62. Thus, the sensor 66 can be used to switch on/off the switch 62 according to the pressure of the discharged anode gas. This invention further comprises a humidifier 70 which is installed along the anode gas output piping after the fuel cell 80 for adjusting the humidity of the discharged anode gas. The discharged anode gas after the adjustment of the humidity thereof is redirected to the anode gas input piping and then into the fuel cell 80 to form an anode gas-recirculation. As illustrated in FIG. 5, this discharged anode gas can also be mixed in the piping with the fresh anode gas which is controlled and released from the anode gas supply 60 that passes through the switch 62 and the regulating device 64.

Figure 6:
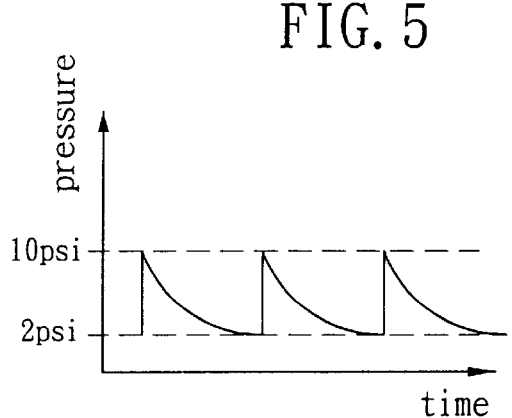
FIG. 6 schematically illustrates the pressure of the anode gas within the fuel cell varying with time according to the preferred embodiment of this invention.

According to the preferred embodiment of this invention, the sensor 66 measures the pressure of the anode gas discharged from the fuel cell 80. When this pressure increases and reaches a first predetermined value, such as a gauge pressure substantially higher than 10 psi, the sensor 66 transmits a signal to switch off the switch 62. When this pressure decreases and reaches a second predetermined value, such as a gauge pressure substantially lower than 2 psi, the sensor 66 transmits another signal to switch on the switch 62. Moreover, the regulating device 64 controls the pressure of the anode gas out of the anode gas supply 60 into the fuel cell 80 to a value approximately the same as the first predetermined value, such as 10 psi in this preferred embodiment. Once the fuel cell 80 starts operation, the switch 62 is opened so that the anode gas can be transported into the fuel cell 80. If the sensor 66 detects that the pressure of the anode gas reaches the first predetermined value, the sensor 66 transmits a control signal to the switch 62 which is thereby switched off. At this time, no more fresh anode gas is supplied. The flow rate of the anode gas is generally set at a value higher than the required Stoichiometric amount for a specific electrical power generation of the fuel cell 80 so as to ensure that the electrochemical reaction takes place completely within the fuel cell 80. Therefore, excessive anode gas after the reaction within the fuel cell 80 will flow into the output piping, and this excessive anode gas can be redirected to the anode gas input 82 of the fuel cell 80 for recycled consumption. As the electrochemical reaction within the fuel cell 80 proceeds, the recycled anode gas will be consumed as well, therefore, the pressure of the excessive discharged anode gas from the fuel cell 80 keeps decreasing. When this pressure decreases and reaches the second predetermined value, the sensor 66 transmits another control signal to switch on the switch 62, so that the fresh anode gas can be provided from the anode gas supply 60 again. FIG. 6 schematically illustrates the pressure of the anode gas within the fuel cell 80 varying with time according to the preferred embodiment of this invention. Accordingly, when the anode gas within the recirculation system of this invention is consumed to a certain extent, fresh anode gas can be automatically supplied to the fuel cell 80 for reaction and thus, the stream recirculation of the anode gas can be achieved and the hydrogen pump 44 required in the conventional technique is utterly unnecessary. This invention therefore reduces the parasitic loss of electrical energy of the fuel cell itself. For this preferred embodiment, about 5% of the generated electrical power from the fuel cell can be saved and thus, the overall efficiency of electrical power generation by the fuel cell system is promoted.

The above design of this invention can provide another advantage. That is, every time the switch 62 is opened, the anode gas with significantly higher pressure will thrust into the whole system, especially into the fuel cell 80. As a result, any water droplet condensed from the reaction of the fuel cell 80 or any undesired particle existing within the gas channels 22 of the bipolar plate 20 will be shattered and/or expelled out of the gas channels 22 by such intermittent high-pressure thrust gas. Thus, this invention also provides a function of intermittently and automatically clearing out the gas channels within the fuel cell.

According to another feature provided by the preferred embodiment of this invention, the humidifier 70 comprises a housing 72 containing a suitable amount of water 74 therein. In addition, a plurality of hydrophilic sheets 76, such as sponge or other articles with similar properties, are provided within the housing 72 and each of the hydrophilic sheets 76 is partially immersed within the water 74. As illustrated in FIG. 5, the discharged excessive anode gas from the fuel cell 80 is directed into the humidifier 70 below the water level therein, the gas will then float out of the water 74 as bubbles, pass through the saturated hydrophilic sheets 76, and then be directed out of the housing 72 at the other end thereof. Thus with such simple construction, the humidity of the recirculated anode gas can be easily controlled by this humidifier 70. As compared with the conventional bubbler or steam generator, the above humidifier 70 of this invention involves more simplified construction and the manufacturing cost thereof is obviously much cheaper. Moreover, such a humidifier 70 does not consume any electrical power during operation and thus, the parasitic loss of electrical energy of the fuel cell itself is further reduced. Nevertheless, the conventional bubbler or steam generator may still be applied in the present anode stream recirculation system according to this invention to achieve the desired function or object. Finally, to ensure that the gas within the piping of the anode stream recirculation system can be directed to the designed direction, a check valve 78 may be provided on both side of the humidifier 70 at some appropriate positions, as illustrated in FIG. 5.

This invention is related to a novel creation that makes a breakthrough to conventional art. Aforementioned explanations, however, are directed to the description of preferred embodiments according to this invention. Various changes and implementations can be made by those skilled in the art without departing from the technical concept of this invention. Since this invention is not limited to the specific details described in connection with the preferred embodiments, changes to certain features of the preferred embodiments without altering the overall basic function of the invention are contemplated within the scope of the appended claims.

What is claimed is:

1. An anode stream recirculation system for a fuel cell, the fuel cell including an anode gas input and an anode gas output, the anode stream recirculation system comprising:

an anode gas supply, providing the anode gas required for reaction of the fuel cell;

a switch connected with the anode gas supply;

a regulating device connected between the switch and the anode gas input of the fuel cell;

a sensor connected with both the anode gas output of the fuel cell and the switch; and a humidifier connected between the anode gas output and anode gas input of the fuel cell, thereby forming an anode gas recirculation.

2. The anode stream recirculation system for a fuel cell according to claim 1, wherein the anode gas is hydrogen.

3. The anode stream recirculation system for a fuel cell according to claim 1, wherein the switch is an electromagnetic valve.

4. The anode stream recirculation system for a fuel cell according to claim 1, wherein the sensor detects pressure of the anode gas discharged from the fuel cell, when the pressure increases to a first predetermined value, the sensor transmits a signal to switch off the switch; when the pressure decreases to a second predetermined value which is lower than the first predetermined value, the sensor transmits another signal to activate the switch.

5. The anode stream recirculation system for a fuel cell according to claim 4, wherein the regulating device controls the pressure of the anode gas out of the anode gas supply into the fuel cell to a value substantially equal to the first predetermined value.

6. The anode stream recirculation system for a fuel cell according to claim 4, wherein the first predetermined value is set to be a gauge pressure substantially higher than 10 psi, and the second predetermined value is set to be a gauge pressure substantially lower than 2 psi.

7. The anode stream recirculation system for a fuel cell according to claim 1, wherein the humidifier comprises a housing containing a suitable amount of water and a plurality of hydrophilic sheets provided therein with each of the sheets being partially immersed within the water.

8. The anode stream recirculation system for a fuel cell according to claim 1, wherein the humidifier is a bubbler.

9. The anode stream recirculation system for a fuel cell according to claim 1, wherein the humidifier is a steam generator.

10. The anode stream recirculation system for a fuel cell according to claim 1, further comprising two check valves with one provided between the anode gas input of the fuel cell and the humidifier, and the other provided between the anode gas output of the fuel cell and the humidifier.

* * * * *